US012676648B2

(12) United States Patent
Jeon et al.

(10) Patent No.: US 12,676,648 B2
(45) Date of Patent: Jul. 7, 2026

(54) APPARATUS AND METHOD FOR CHANNEL SOUNDING

(71) Applicant: Samsung Electronics Co., Ltd., Suwon-si (KR)

(72) Inventors: Eunsung Jeon, Suwon-si (KR); Hunmin Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/928,799

(22) Filed: Oct. 28, 2024

(65) Prior Publication Data

US 2025/0183945 A1     Jun. 5, 2025

(30) Foreign Application Priority Data

Dec. 5, 2023     (KR) ........................ 10-2023-0174935

(51) Int. Cl.
*H04B 7/0417* (2017.01)
*H04B 7/06* (2006.01)
*H04L 25/02* (2006.01)

(52) U.S. Cl.
CPC .......... *H04B 7/0417* (2013.01); *H04B 7/066* (2013.01); *H04L 25/0204* (2013.01)

(58) Field of Classification Search
CPC .... H04B 7/0417; H04B 7/066; H04L 25/0204
See application file for complete search history.

(56) References Cited

U.S. PATENT DOCUMENTS 9,755,712 B1 *   9/2017   Bultan ................... H04L 5/006
10,903,882 B2   1/2021   Jeon et al.
(Continued)

FOREIGN PATENT DOCUMENTS

KR     10-2022-0018925 A     2/2022
KR     10-2022-0145729 A     10/2022
(Continued)

OTHER PUBLICATIONS

"Part 11: Wireless LAN Medium Access Control (MAC) and Physical Layer (PHY) Specifications, Amendment 8: Enhancement for extremely high throughput (Eht)", IEEE P802.11be/D2.0, May 2022.
(Continued)

*Primary Examiner* — Rahel Guarino
(74) *Attorney, Agent, or Firm* — Fish & Richardson P.C.

(57) ABSTRACT

Provided is an operating method of a first device communicating with a second device in a wireless local area network (WLAN) system, the WLAN system including the first device and the second device, and the method including estimating channels corresponding to a plurality of subcarriers using a null data packet (NDP) received from the second device to obtain estimated channels, generating beam steering matrices corresponding to the plurality of subcarriers by performing singular value decomposition on the estimated channels, generating overridden angle information based on the beam steering matrices, the overridden angle information corresponding to target subcarriers among the plurality of subcarriers, and transmitting beamforming feedback to the second device, the beamforming feedback including the overridden angle information.

20 Claims, 18 Drawing Sheets

(56) References Cited

U.S. PATENT DOCUMENTS

| | | |
|---|---|---|
| 11,405,084 B1 | 8/2022 | Changlani et al. |
| 11,595,090 B2 | 2/2023 | Jeon et al. |
| 2021/0173893 A1 | 6/2021 | Luo |
| 2022/0046621 A1 | 2/2022 | Kandala et al. |
| 2023/0086669 A1 | 3/2023 | Yu et al. |

FOREIGN PATENT DOCUMENTS

| | | |
|---|---|---|
| WO | 2022/037761 A1 | 2/2022 |
| WO | 2022/047646 A1 | 3/2022 |

OTHER PUBLICATIONS

Kato, S. et al., "Fundamental Investigation of Wi-Fi Beamforming Report Properties on Wireless Sensing", IEEE 12th Sensor Array and Multichannel Signal Processing Workshop (SAM), Jun. 20-23, 2022, pp. 341-344.

* cited by examiner

START

OBTAIN INFORMATION ABOUT TARGET
SUBCARRIERS — S300

PERFORM OVERRIDING ON ANGLE INFORMATION
CORRESPONDING TO TARGET SUBCARRIERS — S310

GENERATE BEAMFORMING FEEDBACK INCLUDING
OVERRIDDEN ANGLE INFORMATION — S320

END

0   #1   #2   #3   #4   #5   #6   #7   #8   #9   #10   #11   #12   #13   #14   #15

: TARGET SUBCARRIER

: NORMAL SUBCARRIER

0   #1   #2   #3   #4   #5   #6   #7   #8   #9   #10  #11  #12  #13  #14  #15
               [SI]                                    [EI]

: TARGET SUBCARRIER

: NORMAL SUBCARRIER

: TARGET SUBCARRIER

: NORMAL SUBCARRIER

0   #1   #2   #3   #4   #5   #6   #7   #8   #9   #10   #11   #12   #13   #14   #15

: TARGET SUBCARRIER

: NORMAL SUBCARRIER

| Order | Information |
|---|---|
| 1 | Category |
| 2 | EHT Action |
| 3 | EHT MIMO Control |
| 4 | EHT Compressed Beamforming Report |
| 5 | EHT MU Exclusive Beamforming Report |
| 6 | EHT CQI Report |

FIG. 15

APPARATUS AND METHOD FOR CHANNEL SOUNDING

CROSS-REFERENCE TO RELATED APPLICATIONS

This application is based on and claims priority under 35 U.S.C. § 119 to Korean Patent Application No. 10-2023-0174935, filed on Dec. 5, 2023, in the Korean Intellectual Property Office, the disclosure of which is incorporated by reference herein in its entirety.

BACKGROUND

The inventive concepts relate to wireless communication, and more particularly, to an apparatus and method for channel sounding based on a predetermined (or alternatively, given) protocol standard.

As an example of wireless communication, a wireless local area network (WLAN) is technology for connecting two or more devices by using a wireless signal transmission method. WLAN technology may be based on the Institute of Electrical and Electronics Engineers (IEEE) 802.11 standard. The 802.11 standard has evolved into 802.11b, 802.11a, 802.11 g, 802.11n, 802.11ac, and 802.11ax, and supports transmission rates up to 1 Gbyte/s based on orthogonal frequency-division multiplexing (OFDM) technology.

In 802.11ac, data may be transmitted simultaneously (or contemporaneously) to multiple users through the multi-user multi-input multi-output (MU-MIMO) technique. 802.11be, referred to as Extremely High Throughput (EHT) and next-generation protocol standards after EHT (hereinafter, referred to as EHT+) are aimed at implementing support of 6 GHz unlicensed frequency band, utilization of bandwidth of up to 320 MHz per channel, introduction of Hybrid Automatic Repeat and Request (HARQ), and support for up to 16×16 MIMO.

Additionally, in the MU-MIMO communication environment, a beamforming process may be used to improve communication performance. In detail, a beamformer (or access point) performing a beamforming process may perform beamforming based on feedback about a channel, received from a beamformee (or station).

The beamformee provides feedback about the channel to the beamformer in response to a corresponding request from the beamformer. However, in certain communication environments on the beamformee side, there may be cases where the efficiency of the beamforming process is lower, but even in this case, there is a challenge in that the beamformee must passively provide (or passively provides) feedback for beamforming, to the beamformer.

SUMMARY

The inventive concepts provide an apparatus and method for generating beamforming feedback suitable for any communication environment where the data throughput of a beamformee is relatively low by a beamforming process in a wireless communication system, by performing an overriding operation.

According to an aspect of the inventive concepts, there is provided an operating method of a first device communicating with a second device in a wireless local area network (WLAN) system, the WLAN system including the first device and the second device, and the method includes estimating channels corresponding to a plurality of subcarriers using a null data packet (NDP) received from the second device to obtain estimated channels, generating beam steering matrices corresponding to the plurality of subcarriers by performing singular value decomposition on the estimated channels, generating overridden angle information based on the beam steering matrices, the overridden angle information corresponding to target subcarriers among the plurality of subcarriers, and transmitting beamforming feedback to the second device, the beamforming feedback including the overridden angle information.

According to an aspect of the inventive concepts, there is provided a first device communicating with a second device in a WLAN system, the first device including processing circuitry configured to estimate channels corresponding to a plurality of subcarriers using a null data packet (NDP) received from the second device to obtain estimated channels, and generate overridden angle information based on beam steering matrices and unitary matrices, the overridden angle information corresponding to target subcarriers among the plurality of subcarriers, the beam steering matrices and the unitary matrices corresponding to the plurality of subcarriers, and the beam steering matrices and the unitary matrices being generated based on the estimated channels.

BRIEF DESCRIPTION OF THE DRAWINGS

Embodiments will be more clearly understood from the following detailed description taken in conjunction with the accompanying drawings in which:

FIG. 14 is a diagram illustrating information included in a feedback frame to which embodiments of the inventive concepts are applied; and FIG. 15 is a conceptual diagram illustrating an Internet-of-Things (IoT) network system to which embodiments of the inventive concepts are applied.

DETAILED DESCRIPTION

Figure 1:
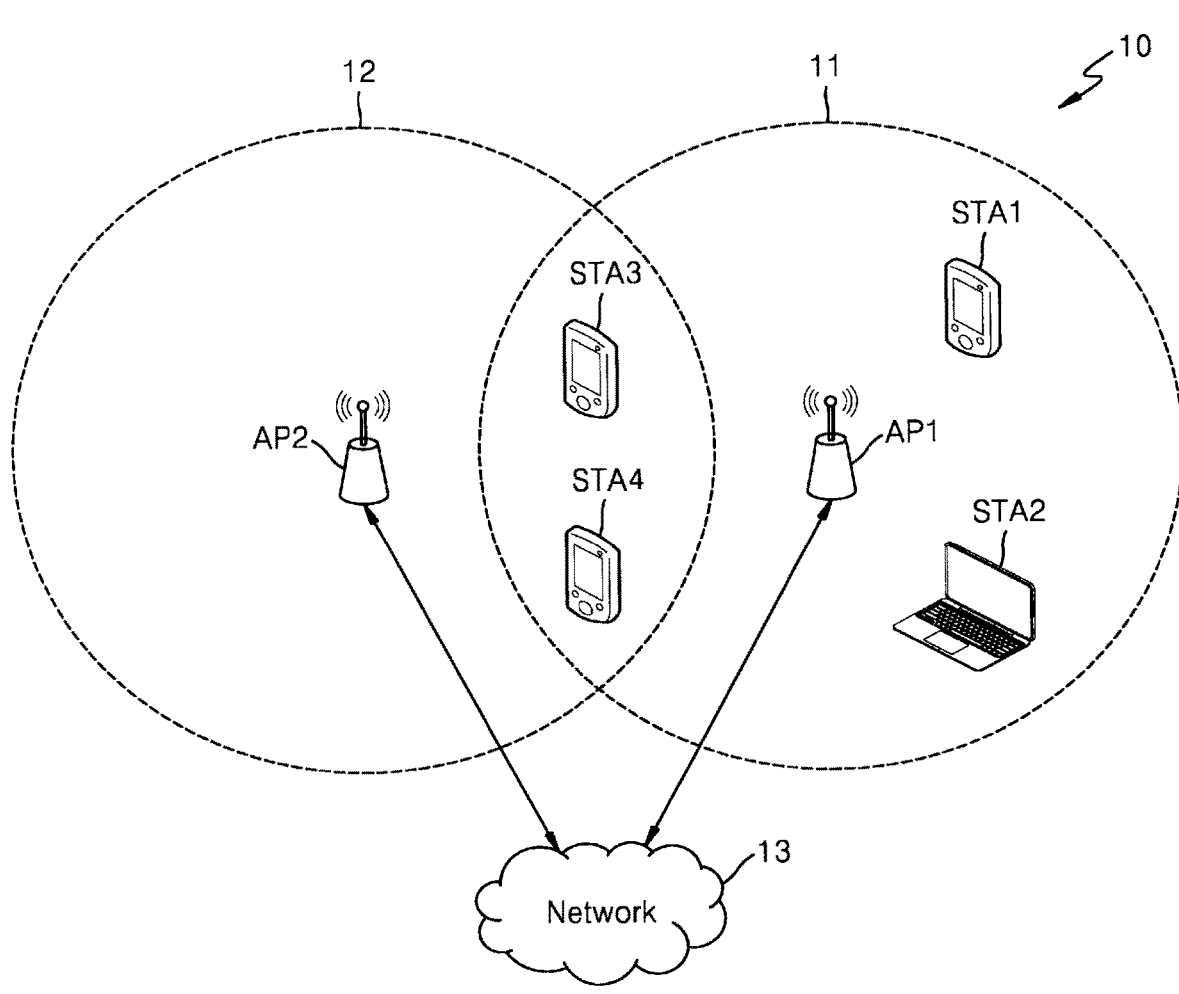
FIG. 1 is a block diagram illustrating a wireless communication system according to embodiments.

FIG. 1 is a block diagram illustrating a wireless communication system 10 according to embodiments. In detail, FIG. 1 illustrates a wireless local area network (WLAN) system as an example of the wireless communication system 10.

Hereinafter, in describing embodiments of the inventive concepts in detail, an orthogonal frequency-division multiplexing (OFDM)—or orthogonal frequency-division multiple access (OFDMA)-based wireless communication system, especially the IEEE 802.11 standard, will be mainly described, but the gist of the inventive concepts is also applicable to other communication systems with a similar technical background and channel type (e.g., cellular communication systems such as long term evolution (LTE), LTE-advanced (LTE-A), new radio (NR), wireless broadband (WiBro), and global system for mobile communication (GSM), or short-range communication systems such as Bluetooth and near field communication (NFC)) with slight modifications without significantly departing from the scope of the inventive concepts, which will be possible based on the judgment of a person skilled in the art.

In embodiments described below, a hardware approach method is described as an example. However, since embodiments include technology using both hardware and software, embodiments do not exclude software-based approaches (e.g., approaches using a combination of hardware and software).

In addition, it will be fully understood that the terms used in the description below are illustrative for convenience of explanation and that the technical ideas of the inventive concepts are not limited thereto.

Referring to FIG. 1, the wireless communication system 10 may include first and second access points AP1, AP2, a first station STA1, a second station STA2, a third station STA3, and/or a fourth station STA4. The first and second access points AP1, AP2 may be connected to a network 13 including the Internet, an Internet Protocol (IP) network, or any other network. The first access point AP1 may provide access to the network 13 within a first coverage area 11, to the first station STA1, the second station STA2, the third station STA3, and the fourth station STA4, and the second access point AP2 may also provide access to the network 13 within a second coverage area 12, to the third and fourth stations STA3, STA4. In embodiments, the first and second access points AP1, AP2 may communicate with at least one of the first station STA1, the second station STA2, the third station STA3, and/or the fourth station STA4 based on wireless fidelity (WiFi) or any other WLAN access technology.

An access point may be referred to as a router, a gateway, etc., and a station may be referred to as a mobile station, a subscriber station, a terminal, a mobile terminal, a wireless terminal, user equipment, or a user, etc. A station may be a portable device, such as a mobile phone, a laptop computer, a wearable device, etc., or a stationary device, such as a desktop computer, a smart TV, etc. In the present specification, a station may be referred to as a first device and an access point may be referred to as a second device.

The first and second access points AP1, AP2 may allocate at least one resource unit (RU) to at least one of the first to fourth stations STA1 to STA4. The first and second access points AP1, AP2 may transmit data through the at least one allocated resource unit, and at least one station may receive data through the at least one allocated resource unit. In 802.11ax, the first and second access points AP1, AP2 may allocate only a single resource unit to at least one station, while in 802.11be (hereinafter EHT) or the next-generation IEEE 802.11 standards (hereinafter EHT+), the first and second access points AP1, AP2 may allocate only a multiresource unit (MRU) including two or more resource units, to at least one station. For example, the first access point AP1 may allocate multiple resource units to at least one of the first station STA1, the second station STA2, the third station STA3, and/or the fourth station STA4 and transmit data through the allocated multiple resource units.

In embodiments, the first and second access points AP1, AP2 may communicate with at least one of the first to fourth stations STA1 to STA4 by using a beamforming technique. For example, single-user beamforming may improve the reception performance of a single user, and multi-user beamforming may improve the reception performance of multiple users by removing interference between multiple users. The first and second access points AP1, AP2 and the first to fourth stations STA1 to STA4 may perform channel sounding for beamforming, and channel sounding may be based on a sounding protocol. As described below with reference to the drawings, the first and second access points AP1, AP2 may efficiently perform channel sounding with the first to fourth stations STA1 to STA4 that support various protocol standards (e.g., EHT, EHT+, etc.). Hereinafter, a schematic example of channel sounding between the first access point AP1 and the first station STA1 is described. The channel sounding between the first access point AP1 and the first station STA1 may also be applied to the second access point AP2 and the second to fourth stations STA2 to STA4.

The first access point AP1 may transmit a null data packet (NDP) based on a predetermined (or alternatively, given) protocol standard, to the first station STA1. The first station STA1 may estimate, by using the NDP, channels formed between the first access point AP1 and the first station STA1. The first station STA1 may estimate channels corresponding to a plurality of subcarriers by using the received NDP. A plurality of subcarriers may correspond to subcarriers on which the first access point AP1 wishes to provide channel-related feedback to the first station STA1, and information indicating the plurality of subcarriers may be provided by the first access point AP1 in advance to the first station STA1.

The first station STA1 may generate beam steering matrices corresponding to the plurality of subcarriers by performing singular value decomposition on the estimated channels corresponding to the plurality of subcarriers. The first station STA1 may generate angle information corresponding to a plurality of subcarriers from the beam steering matrices corresponding to the plurality of subcarriers.

In embodiments, the first station STA1 may override angle information corresponding to target subcarriers among the plurality of subcarriers in response to determining an overriding condition for beamforming feedback is satisfied. In the present specification, overriding of angle information refers to replacing values of the angle information with certain values, and the certain values may be preset (or alternatively, given) values such that a beamforming process is not applied to a subcarrier corresponding to the angle information. Embodiments in which the first station STA1 overrides angle information corresponding to target subcarriers are described with reference to FIGS. 12 and 13.

In embodiments, whether the overriding condition is satisfied may be determined by the first access point AP1 or the first station STA1. In examples in which the first station STA1 determines whether the overriding condition is satisfied, angle information corresponding to target subcarriers may be overridden without notification to the first access point AP1 in response to determining the overriding condition is satisfied. In examples in which the first access point AP1 determines whether the overriding condition is satisfied, a notification for requesting overriding of the angle information corresponding to the target subcarriers to the first station STA1 may be provided in response to determining the overriding condition is satisfied.

In embodiments, the overriding condition may include a condition in which the number of negative acknowledgment (NACK) transmissions or receptions between the first access point AP1 and the first station STA1 exceeds a threshold number during a predetermined (or alternatively, given) period of time. However, this is an example and embodiments are not limited thereto, and the overriding condition may include a condition in which the data throughput due to beamforming between the first access point AP1 and the first station STA1 may be significantly lowered (e.g., a condition where the data throughput is lowered to be (or is, falls, etc.) below a threshold). An example thereof is described with reference to FIG. 6.

In embodiments, the first station STA1 may determine all of a plurality of subcarriers as target subcarriers. In embodiments, some subcarriers among a plurality of subcarriers (e.g., a subset of the plurality of subcarriers) may be determined as target subcarriers. In embodiments, the first station STA1 may determine whether each subcarrier among a plurality of subcarriers corresponds to a target subcarrier. Embodiments of these are described with reference to FIGS. 8A to 11.

In embodiments, the first station STA1 may transmit beamforming feedback including overridden angle information corresponding to target subcarriers, to the first access point AP1. In embodiments, the beamforming feedback may further include angle information corresponding to general subcarriers rather than the target subcarriers.

In embodiments, the first access point AP1 may not apply the beamforming process to target subcarriers, based on the overridden angle information included in the beamforming feedback, but may transmit a Physical Protocol Data Unit (PPDU) to a beamformee through a plurality of subcarriers.

Embodiments in which the first access point AP1 and the first station STA1 transmit and receive beamforming feedback and perform beamforming based on the beamforming feedback may be defined by (or correspond to) a predetermined (or alternatively, given) protocol standard. As an example, the predetermined (or alternatively, given) protocol standard may be an EHT protocol standard or an EHT+ protocol standard.

The first to fourth stations STA1 to STA4 according to embodiments may override angle information corresponding to target subcarriers among a plurality of subcarriers in a certain communication environment where the beamforming efficiency of the first and second access points AP1, AP2 is lower, and provide the overridden angle information to the first and second access points AP1, AP2, thereby minimizing (or reducing) resources used for lower-efficiency beamforming. As a result, overall communication performance may be improved by improving data throughput between the first to fourth stations STA1 to STA4 and the first and second access points AP1, AP2 in a certain communication environment.

Figure 2:
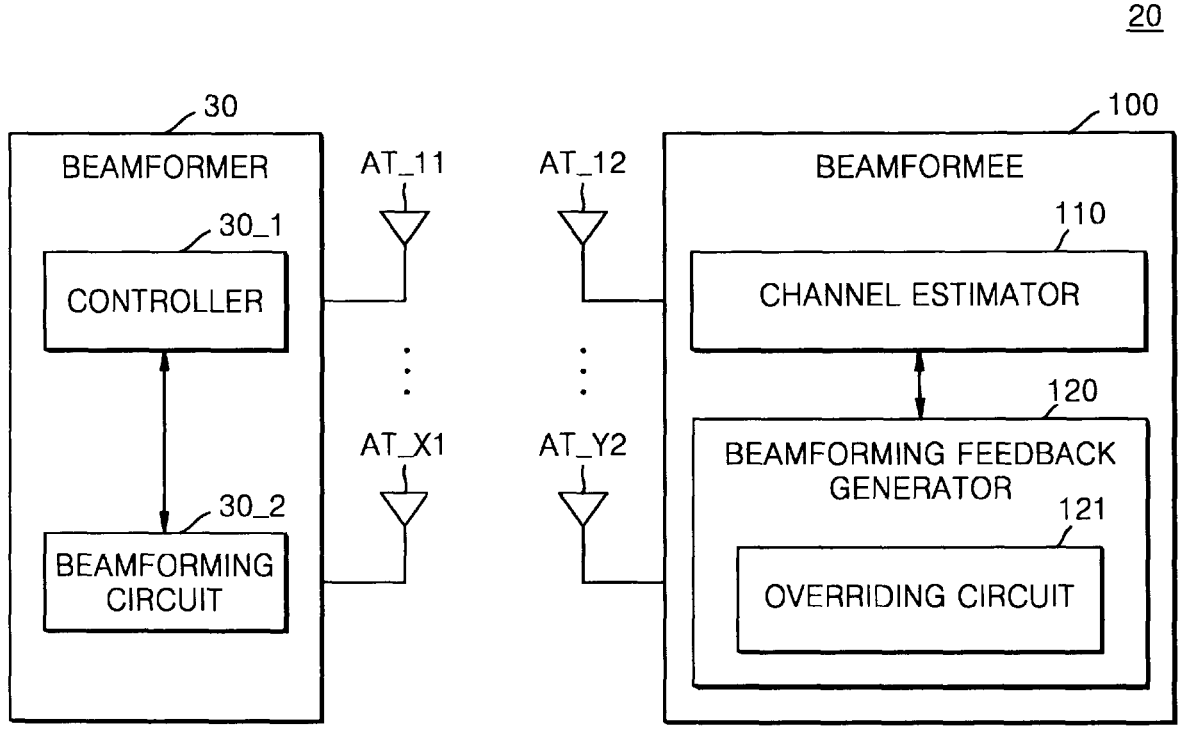
FIG. 2 is a block diagram illustrating a wireless communication system according to embodiments.

FIG. 2 is a block diagram illustrating a wireless communication system 20 according to embodiments. FIG. 2 illustrates a beamformer 30 and a beamformee 100 that communicate with each other within the wireless communication system 20. Each of the beamformer 30 and the beamformee 100 may be any device that communicates in the wireless communication system 20 and may be referred to as a device for wireless communication. In embodiments, each of the beamformer 30 and the beamformee 100 may be an access point or station of a WLAN system.

Referring to FIG. 2, the beamformer 30 may include a controller 30_1, a beamforming circuit 30_2, and/or a plurality of first antennas AT_11 to AT_X1. In embodiments, the controller 30_1 and the beamforming circuit 30_2 may be defined as processing circuits of the beamformer 30. The beamformee 100 may include a channel estimator 110, a beamforming feedback generator 120, and/or a plurality of second antennas AT_12 to AT_Y2. In embodiments, the channel estimator 110 and the beamforming feedback generator 120 may be defined as processing circuits of the beamformee 100. Hereinafter, the beamformee 100 will be described first.

The beamformee 100 may receive an NDP from the beamformer 30 through the plurality of second antennas AT_12 to AT_Y2. The channel estimator 110 may estimate channels for a plurality of subcarriers by using a reference signal included in the received NDP. In embodiments, an NDP may also be referred to as a sounding packet. The NDP ($y_k$) received by the channel estimator 110 for channel estimation may be expressed as [Equation 1].

[Equation 1]

$$y_k = H_k x_k + n_k$$

In [Equation 1], $H_k$ is a channel matrix of a subcarrier, $x_k$ is a transmission data signal, and $n_k$ may indicate thermal noise. k may indicate a subcarrier index of a channel and may range from 1 to $N_{FFT}$. The size of the channel matrix $H_k$ may be Nr×Nt. Here, Nr may be an index related to the number of second antennas AT_12 to AT_Y2, and Nt may be an index related to the number of first antennas AT_11 to AT_X1. Each element of [Equation 1] may be defined as a matrix or vector. As an example, the transmission data signal $x_k$ may have a size of Nt×1. Thermal noise $n_k$ may refer to white Gaussian noise. Thermal noise $n_k$ may have a size of Nr×1.

The channel estimator 110 may generate channel state information based on the estimated channel. The channel state information may include at least one of a Channel Quality Indicator (CQI), a Precoding Matrix Indicator (PMI), and/or a Rank Indicator (RI).

The beamforming feedback generator 120 may perform singular value decomposition on channels $\hat{H}_{est,k}$ estimated from the channel estimator 110 as shown in [Equation 2].

[Equation 2]

$$\hat{H}_{est,k} = U_k \sum_k V_k^h$$

In [Equation 2] $U_k$ is a left singular matrix and $V_k$ is a right singular matrix and may include a Hermitian operator. $\Sigma_k$ may be a diagonal matrix including non-negative singular values.

The size of the left singular matrix $U_k$ may be Nr×Nc. Here, Nc may be an index related to the number of streams (or number of layers) or the number of first antennas AT_11 to AT_X1. The size of the right singular matrix $V_k$ may be Nr×Nc. Also, the size of $\Sigma_k$ may be Nc×Nc. The right singular matrix $V_k$ may be referred to as a beam steering matrix. In the wireless communication system 20 (e.g., IEEE 802.11n/ac/ax WLAN system) according to embodiments, the beamformer 30 transmits a signal to the beamformee 100 through OFDM demodulation, in which orthogonality of $N_{FFT}$ subcarriers within one symbol, with respect to each other, is guaranteed, and thus, a channel estimation operation of the channel estimator 110 and a singular value decomposition operation of the beamforming feedback generator 120 may be performed for each subcarrier.

To reduce feedback overhead transmitted to the beamformer 30, the beamforming feedback generator 120 may not transmit a beam steering matrix $V_k$ as is to the beamformer 30 but may apply a diagonal matrix D for performing common phase shift, to the beam steering matrix $V_k$ as in [Equation 3].

[Equation 3]

$$Q_k = V_k D$$

$Q_k$ may be a late beam steering matrix, and a first diagonal matrix D may be a matrix for an element of the last row of each column of the late beam steering matrix $Q_k$ to be a real number. As an example, the first diagonal matrix D may be $(e^{-j\phi(Nt,1)}, \ldots, e^{-j\phi(Nt,Nr)})$, for example, $e^{-j\phi(Nt,1)}$ may refer to a phase value of an element corresponding to an Ntth row and the first column of the beam steering matrix $V_k$. In embodiments, the first diagonal matrix D may include a phase value of an element of the last row of each column of the beam steering matrix $V_k$.

$$Q_k = \left[ \prod_{i=1}^{min(N_r,N_t-1)} \left[ D_i\left(1_{i-1}, e^{j\phi_{i,i}}, \ldots, e^{j\phi_{Nr-1,i}}, 1\right) \prod_{l=i+1}^{N_t} G_{li}^T(\psi_{li}) \right] \right] \quad \text{[Equation 4]}$$

$$\tilde{I}_{Nt \times Nr}$$

In [Equation 4] $1_{i-1}$ is a vector composed of Is having a length i−1. $\tilde{I}_{Nt \times Nr}$ is an identity matrix having a size of Nt×Nr.

In [Equation 4] $D_i(1_{i-1}, e^{j\phi_{i,i}}, \ldots, e^{j\phi_{Nr-1,i}}, 1)$ may be expressed as a second diagonal matrix as shown in [Equation 5] below.

$$D_i\left(1_{i-1}, e^{j\phi_{i,i}}, \ldots, e^{j\phi_{Nr-1,i}}, 1\right) = \quad \text{[Equation 5]}$$

$$\begin{bmatrix} I_{i-1} & 0 & \ldots & \ldots & 0 \\ 0 & e^{j\phi_{i,i}} & 0 & \ldots & 0 \\ \vdots & 0 & \ddots & 0 & 0 \\ \vdots & \vdots & 0 & e^{j\phi_{N_t-1,i}} & 0 \\ 0 & 0 & 0 & 0 & 1 \end{bmatrix},$$

In [Equation 4] $G_{li}(\psi)$ is a Givens rotation matrix and may be expressed as [Equation 6] below.

[Equation 6]

$$G_{li}(\psi) = \begin{bmatrix} I_{i-1} & 0 & 0 & \ldots & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{Nt-1} \end{bmatrix}$$

That is, the beamforming feedback generator 120 may generate angle information ($\phi,\psi$) indicating phase and size from the beam steering matrices $V_k$ of a plurality of subcarriers. $\phi$ denotes a phase of the beam steering matrix $V_k$, and $\psi$ denotes the size of the beam steering matrix $V_k$.

In embodiments, the beamforming feedback generator 120 may include an overriding circuit 121. The overriding circuit 121 may override angle information ($\phi,\psi$) corresponding to target subcarriers among the plurality of subcarriers. As an example, the overriding circuit 121 may replace, from among the beam steering matrices $V_k$, first beam steering matrices corresponding to target subcarriers with first unitary matrices (I) and generate overridden angle information corresponding to the target subcarriers, from the first unitary matrices (I). As another example, the overriding circuit 121 may generate overridden angle information by generating, from first beam steering matrices corresponding to target subcarriers from among the beam steering matrices $V_k$, first angle information corresponding to target subcarriers, and replacing values of the first angle information with values that match the first unitary matrix (I).

In embodiments, the overriding circuit 121 may override only the phase ($\phi$), or only the size ($\psi$) from among the angle information ($\phi,\psi$) corresponding to the target subcarriers.

In embodiments, the first unitary matrix (I) is a diagonal matrix, and elements thereof with the same column index and row index (or with a similar column index and/or row index) may have a value of 1, and elements thereof with different column index and row index may have a value of 0. Additionally, the first unitary matrix (I) may be preset (or alternatively, given), for example, as below according to a size Nc×Nr of late beam steering matrices $Q_k$.

$$Nc = 2, Nr = 1 \rightarrow I = [1, 0]^T \quad (1)$$

$$Nc = 2, Nr = 2 \rightarrow I = \begin{bmatrix} 1 & 0 \\ 0 & 1 \end{bmatrix} \quad (2)$$

$$Nc = 3, Nr = 2 \rightarrow I = \begin{bmatrix} 1 & 0 \\ 0 & 1 \\ 0 & 0 \end{bmatrix} \quad (3)$$

In embodiments, values of the overridden angle information corresponding to the target subcarriers from the overriding circuit 121 may all have values of 0. As an example, ($\phi_h,\psi_h$), which is the overridden angle information of a target subcarrier with an index of h, may be (0, 0).

In embodiments, the overriding circuit 121 may override angle information corresponding to the target subcarriers by using a second unitary matrix (I) instead of the first unitary matrix (I).

The second unitary matrix (P) may be preset (or alternatively, given), for example, as below according to a size Nc×Nr of the late beam steering matrices $Q_k$.

$$Nc = 2, Nr = 1 \rightarrow P = \frac{1}{\sqrt{2}}[1, 0]^T \text{ or } [1, 0]^T \text{ or } [0, 1]^T \quad (1)$$

$$Nc = 3, Nr = 2 \rightarrow P = \frac{\sqrt{2}}{\sqrt{3}}\begin{bmatrix} 1 & 0 \\ 0 & 1 \\ 1 & 0 \end{bmatrix} \text{ or } \begin{bmatrix} 1 & 0 \\ 0 & 1 \\ 0 & 0 \end{bmatrix} \text{ or } \begin{bmatrix} 1 & 0 \\ 0 & 0 \\ 0 & 1 \end{bmatrix} \quad (2)$$

In addition, in examples in which Nc=Nr, the overriding circuit 121 may use the second unitary matrix (P) which satisfies [Equation 7] below.

US 12,676,648 B2

9

[Equation 7]

$$PP^h = P^h P = I$$

P may be the second unitary matrix, $P^h$ may be a matrix obtained by performing hermitian transpose on P, and I may be the first unitary matrix.

Furthermore, the overriding circuit 121 may use the second unitary matrix (P) as below.

$$P = \frac{1}{\sqrt{N}} \begin{bmatrix} 1 & 1 & 1 & 1 & \dots & 1 \\ 1 & \omega & \omega^2 & \omega^3 & \dots & \omega^{(N-1)} \\ 1 & \omega^2 & \omega^4 & \omega^6 & \dots & \omega^{2(N-1)} \\ 1 & \omega^3 & \omega^6 & \omega^9 & \dots & \omega^{3(N-1)} \\ \vdots & \vdots & \vdots & \vdots & & \vdots \\ 1 & \omega^{N-1} & \omega^{2(N-1)} & \omega^{3(N-1)} & \dots & \omega^{(N-1)(N-1)} \end{bmatrix} \text{ where}$$

$$\omega = e^{-j2\pi/N}$$

N may match the number of rows of the second unitary matrix (P).

In embodiments, the overriding circuit 121 may determine (e.g., confirm) whether the overriding condition is satisfied before generating beamforming feedback according to NDP reception. For example, the overriding circuit 121 may monitor a communication state between the beamformee 100 and the beamformer 30, and determine (e.g., confirm) that the overriding condition is met in response to determining that beamforming for some or all subcarriers is not appropriate. As an example, the overriding circuit 121 may determine that the overriding condition is satisfied in response to determining the number of times the beamformee 100 transmits a NACK to the beamformer 30 during a predetermined (or alternatively, given) period exceeds a threshold number. In another example, the beamformer 30 may determine whether the overriding condition is satisfied, before transmitting an NDP to the beamformee 100, and in response to determining that the overriding condition is satisfied, the beamformer 30 may include information indicating that the overriding condition is satisfied, in an NDP (or in a null data packet announcement (NDPA) frame). The overriding circuit 121 may check, from the NDP (or NDPA frame), whether the overriding condition is satisfied.

In embodiments, the overriding circuit 121 may determine target subcarriers among a plurality of subcarriers. As an example, the overriding circuit 121 may determine all of the plurality of subcarriers as target subcarriers. As another example, the overriding circuit 121 may determine some subcarriers among a plurality of subcarriers as target subcarriers. As another example, the overriding circuit 121 may determine, for each subcarrier, whether a plurality of subcarriers correspond to a target subcarrier.

In embodiments, the beamformer 30 may determine target subcarriers among a plurality of subcarriers and may provide, before an NDP, an NDPA frame containing information indicating the target subcarriers, to the beamformee 100.

In embodiments, the beamforming feedback generator 120 may generate beamforming feedback including overridden angle information corresponding to the target subcarriers. In embodiments, the beamforming feedback may further include angle information corresponding to general subcarriers rather than target subcarriers. The beamformee 100 may transmit beamforming feedback to the beamformer 30 through a transceiver of the beamformee 100 and the plurality of second antennas AT_12 to AT_Y2.

The beamformer 30 may receive beamforming feedback from the beamformee 100 through a transceiver (not shown) and the plurality of first antennas AT_11 to AT_X1. The controller 30_1 may control all operations of the beamformer 30 for communication. The controller 30_1 may generate an NDPA frame and an NDP, and may process information included in the beamforming feedback such that the beamforming circuit 30_2 may use the information.

In embodiments, the beamforming circuit 30_2 may selectively perform beamforming for the beamformee 100 for each subcarrier based on beamforming feedback. That is, the beamforming circuit 30_2 may not perform beamforming on target subcarriers corresponding to overridden angle information.

Figure 3:
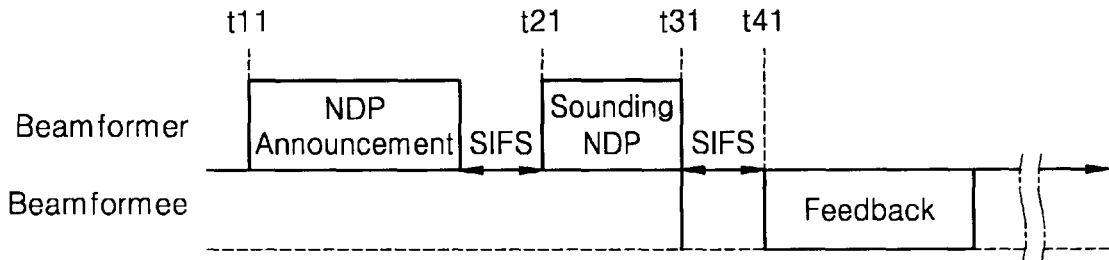
FIG. 3 is a timing diagram illustrating channel sounding according to embodiments.

FIG. 3 is a timing diagram illustrating channel sounding according to embodiments. In detail, the timing diagram of FIG. 3 shows channel sounding performed by a beamformer and a beamformee. Channel sounding may be based on various protocol standards. In embodiments, the beamformer may be an access point (or a second device) and the beamformee may be a station (or a first device). However, it should be noted that FIG. 3 is only an example, and embodiments of the inventive concepts are not limited to the channel sounding of FIG. 3.

Referring to FIG. 3, at time t11, the beamformer may transmit an NDPA frame to the beamformee. For example, the beamformer may transmit an NDPA frame notifying transmission of a sounding NDP to the beamformee to obtain downlink channel state information. The NDPA frame may be a control frame, and the beamformee may prepare for reception of a sounding NDP based on the NDPA frame.

At time t21, the beamformer may transmit a sounding NDP (or an NDP) to the beamformee. For example, after transmitting an NDPA frame to the beamformer, the beamformer may transmit a sounding NDP (or NDP) to the beamformer after a short interframe space (SIFS) time. The beamformer may transmit a sounding NDP to the beamformee through a plurality of subcarriers using a plurality of first antennas, and the beamformee may estimate channels corresponding to the plurality of subcarriers based on the received sounding NDP. The beamformee may generate beam steering matrices corresponding to a plurality of subcarriers through singular value decomposition of the estimated channels and generate angle information corresponding to the plurality of subcarriers from the beam steering matrices. In embodiments, the beamformee may override angle information corresponding to the target subcarriers among the plurality of subcarriers. The beamformee may generate beamforming feedback including overridden angle information.

At time t41, the beamformee may transmit beamforming feedback to the beamformer. For example, the beamformee may transmit beamforming feedback to the beamformer after time t31, which is after receiving the sounding NDP, after an SIFS time.

The beamformer may generate a PPDU based on beamforming feedback including the overridden angle information and transmit the PPDU to the beamformee. According to embodiments, for example, the generation and/or transmission of the PPDU may include signal processing operations such as modulating, upconverting, filtering, amplifying and/or encrypting.

Figure 4:
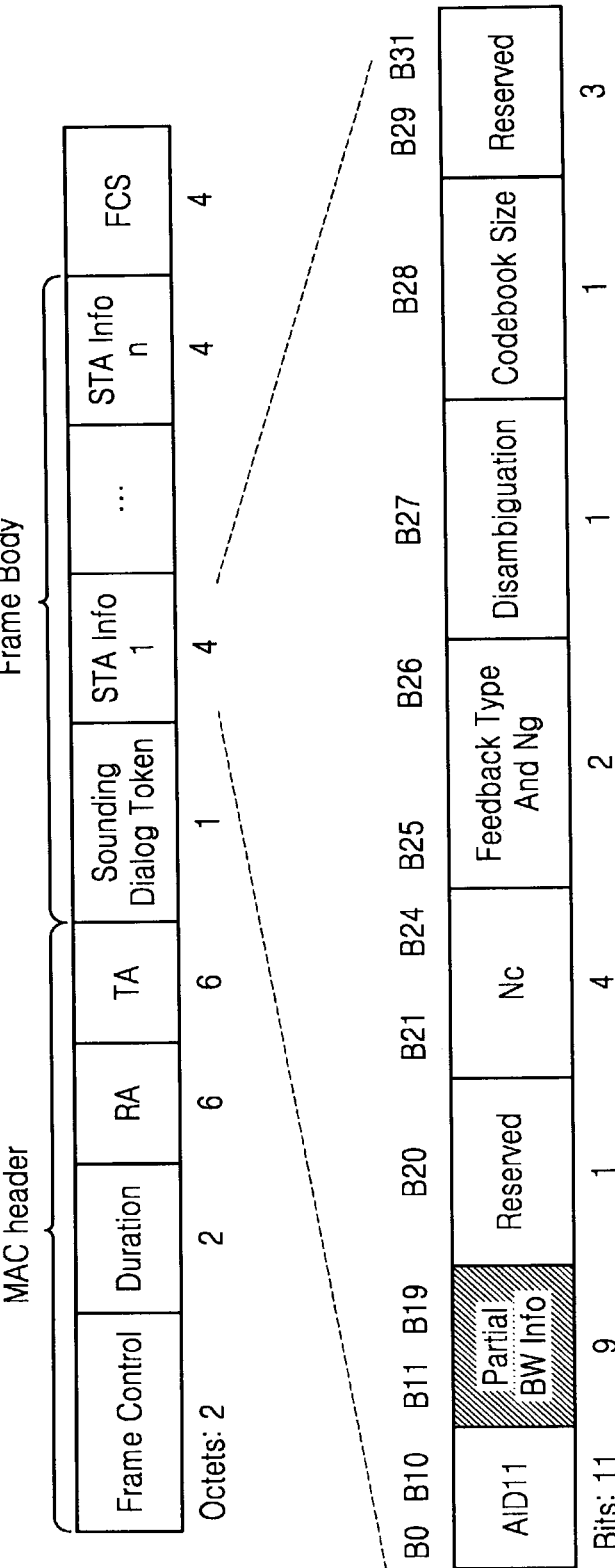
FIG. 4 is a diagram illustrating a null data packet announcement (NDPA) frame according to embodiments.

FIG. 4 is a diagram illustrating an NDPA frame according to embodiments.

Referring to FIG. 4, the NDPA frame may include a medium access control (MAC) header, a frame body, and a Frame Check Sequence (FCS) field. The NDPA frame may include a frame control field, a duration field, a receiver address (RA) field, and a transmitter address (TA) field in the MAC header, and include a sounding dialog token field and n (where n is an integer greater than zero) STA information fields in the frame body. The NDPA frame may include information necessary for (or used by) beamformees to perform channel sounding.

The frame control field may include information about the version of a MAC protocol and other additional control information. The duration field may include time information for setting up a network allocation vector (NAV) or information about a user's identifier (e.g., association identifier (AID)). The RA field may include address information of a beamformee receiving the NDPA frame, and the TA field may include address information of a beamformer transmitting the NDPA frame. The sounding dialog token field may be referred to as a sounding sequence field and may include identification information for the NDPA frame, as described below. The STA information field may be referred to as a user information field, and the NDPA frame may include first to nth STA information fields corresponding to the first to nth beamformers receiving the NDPA frame.

The first STA information field may include an 'AID11' field where information about the identifier AID11 for the first STA (or first user) is placed, a 'Partial BW Info' field where partial bandwidth information is placed, an 'Nc' field in which information about the number of subcarriers is placed, a 'Feedback Type And Ng' field in which information about the feedback type is placed, a 'Disambiguration' field, a 'Codebook Size' field, and a 'Reserved' field.

The 'Partial BW Info' field may include information indicating a plurality of subcarriers, channels of which are requested by the beamformer (or access point) for feedback. In embodiments, a beamformee (or station) which is a target of the first STA information field refers to the 'Partial BW Info' field to check a plurality of subcarriers and determine all or some of the plurality of subcarriers as target subcarriers. In embodiments, the 'Partial BW Info' field may further include information necessary for (or used by) the beamformee to determine target subcarriers.

Figure 5:
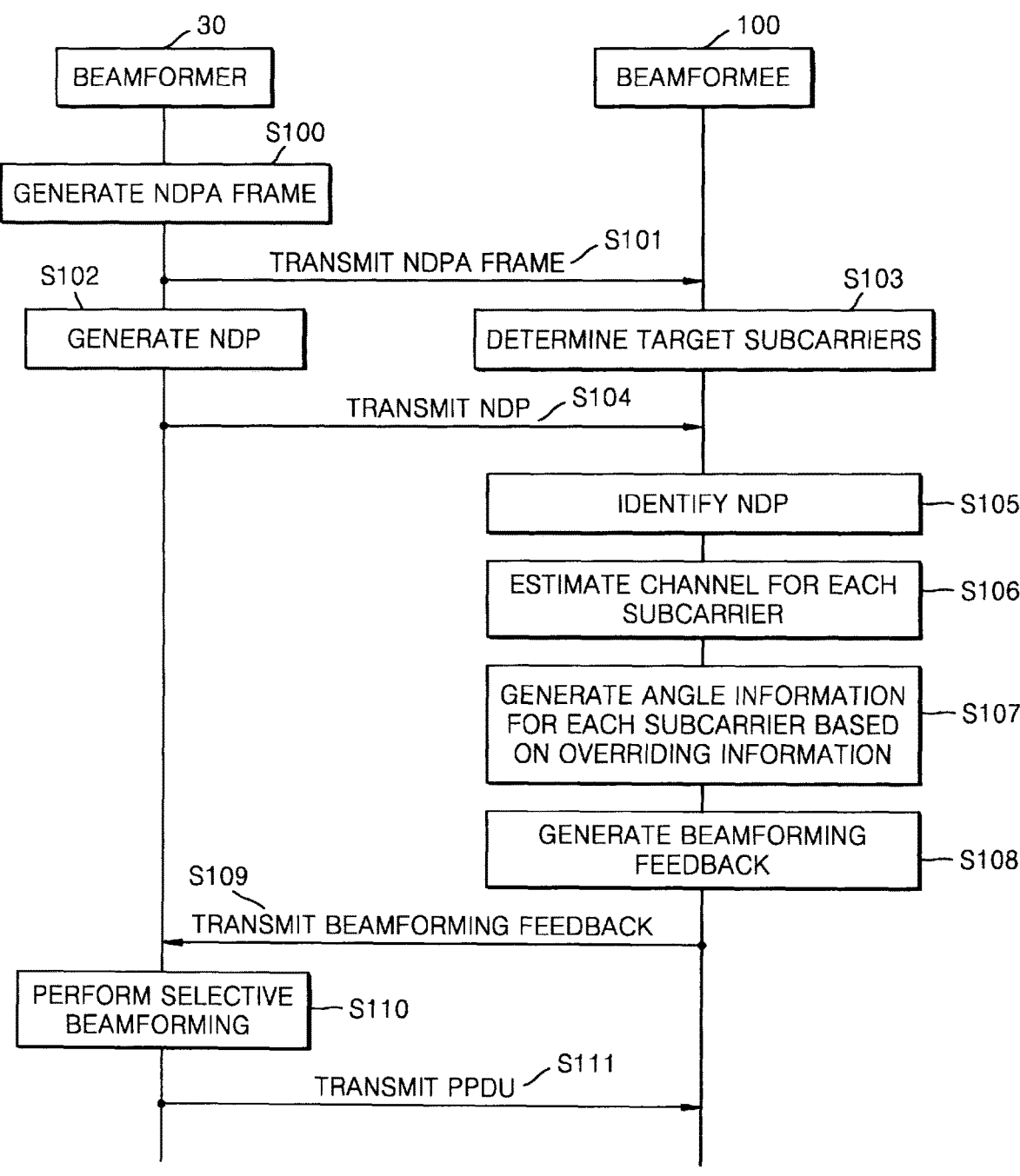
FIG. 5 is a message diagram illustrating a method for channel sounding, according to embodiments.

FIG. 5 is a message diagram illustrating a method for channel sounding, according to embodiments. In detail, the message diagram of FIG. 5 shows operations of the beamformer 30 as an access point and the beamformee 100 as one of a plurality of stations over time. In FIG. 5, it is assumed that a communication environment satisfies an overriding condition.

Referring to FIG. 5, in operation S100, the beamformer 30 may generate an NDPA frame. As an example, the beamformer 30 may select one beamformee 100 to perform channel sounding from among associated beamformees and generate an NDPA frame based on the selected beamformee 100. The NDPA frame may include a control frame, and the beamformee 100 may prepare for reception of an NDP based on the NDPA frame.

In operation S101, the beamformer 30 may transmit an NDPA frame to the beamformee 100.

In operation S102, the beamformer 30 may generate an NDP corresponding to the beamformee 100.

In operation S103, the beamformee 100 may determine all or some of a plurality of subcarriers indicated in a predetermined (or alternatively, given) field (e.g., 'Partial BW Info' field) of the NDPA frame as target subcarriers. As an example, the beamformee 100 may determine all of the plurality of subcarriers as target subcarriers or determine some of the plurality of subcarriers as target subcarriers in a predetermined (or alternatively, given) manner. In embodiments, the beamformee 100 may determine for each subcarrier whether a plurality of subcarriers correspond to a target subcarrier.

In operation S104, the beamformer 30 may transmit the NDP to the beamformee 100.

In operation S105, the beamformee 100 may identify the NDP. As an example, the beamformee 100 may extract information (or data) included in fields of the NDP transmitted from the beamformer 30 to the beamformee 100.

In operation S106, the beamformee 100 may perform channel estimation for each subcarrier by using information extracted from NDP fields. As an example, the beamformee 100 may estimate channels corresponding to subcarriers, perform singular value decomposition on the estimated channels, and generate beam steering matrices corresponding to the subcarriers.

In operation S107, the beamformee 100 may generate angle information for each subcarrier based on an overriding operation. In an example, the beamformee 100 may generate overridden angle information by overriding angle information corresponding to the target subcarriers determined in operation S103.

In operation S108, the beamformee 100 may generate beamforming feedback including the overridden angle information generated in operation S107.

In operation S109, the beamformee 100 may transmit the beamforming feedback generated in operation S108 to the beamformer 30.

In operation S110, the beamformer 30 may perform selective beamforming based on the beamforming feedback. For example, the beamformer 30 may not perform beamforming on the target subcarriers.

In operation S111, the beamformer 30 may transmit a PPDU according to the selective beamforming to the beamformee 100.

Figure 6:
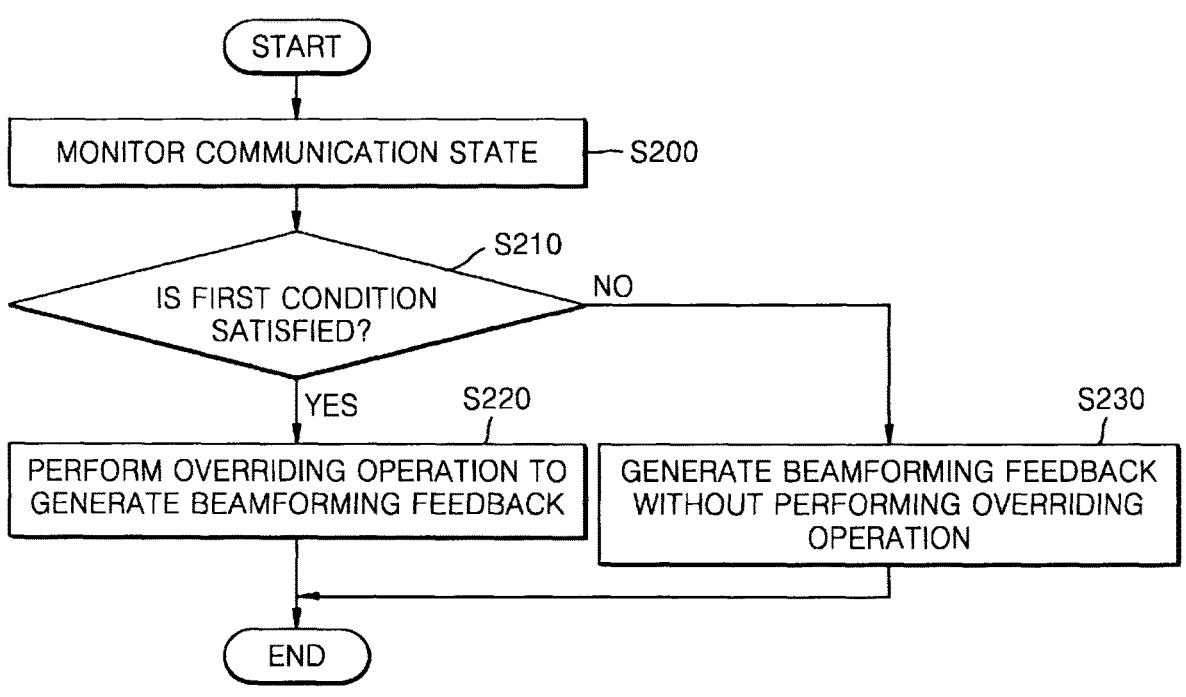
FIG. 6 is a flowchart of an operating method of a beamformee, according to embodiments.

FIG. 6 is a flowchart of an operating method of a beamformee, according to embodiments. FIG. 6 describes how the beamformee determines whether an overriding condition is satisfied.

Referring to FIG. 6, in operation S200, the beamformee may monitor a state of communication with a beamformer. As an example, the beamformee may continuously monitor whether the number of NACK transmissions to the beamformer exceeds a threshold number during a predetermined (or alternatively, given) period.

In operation S210, the beamformee may determine whether a monitoring communication environment satisfies a first condition in operation S210. The first condition may be included in the overriding condition described above. As an example, the beamformee may determine that the first condition is satisfied based on the number of NACK transmissions to the beamformer during a predetermined (or alternatively, given) period exceeding the threshold number.

In response to the result of operation S210 being 'YES', in the following operation S220, the beamformee may perform an overriding operation to generate beamforming feedback. In embodiments, the overriding operation may be defined as an overriding operation for angle information corresponding to target subcarriers.

In response to the result of operation S210 being 'NO', in the following operation S230, the beamformee may generate beamforming feedback without performing an overriding operation. That is, the beamformee may generate angle information corresponding to a plurality of subcarriers and generate beamforming feedback including the angle information.

Figure 7:
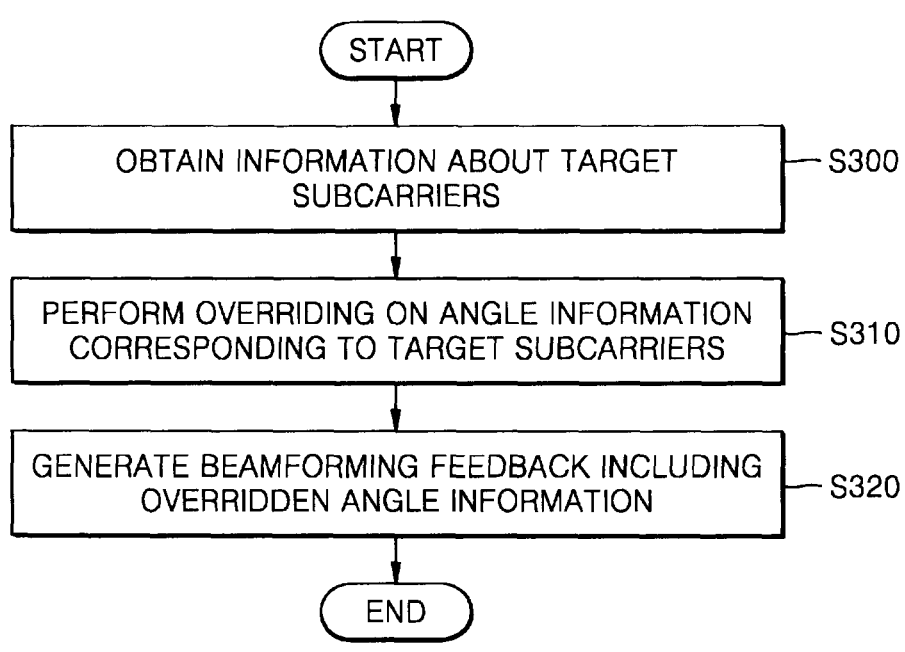
FIG. 7 is a flowchart of an operating method of a beamformee, according to embodiments.

FIG. 7 is a flowchart of an operating method of a beamformee, according to embodiments.

Referring to FIG. 7, in operation S300, the beamformee may obtain information about target subcarriers. In embodiments, the information may include at least one of first information indicating whether an overriding condition is satisfied and second information necessary (or used) to determine target subcarriers among a plurality of subcarriers.

In operation S310, the beamformee may perform overriding on angle information corresponding to target subcarriers based on the information obtained in operation S300.

In operation S320, the beamformee may generate beamforming feedback including the angle information overridden in operation S320.

Figure 8A:
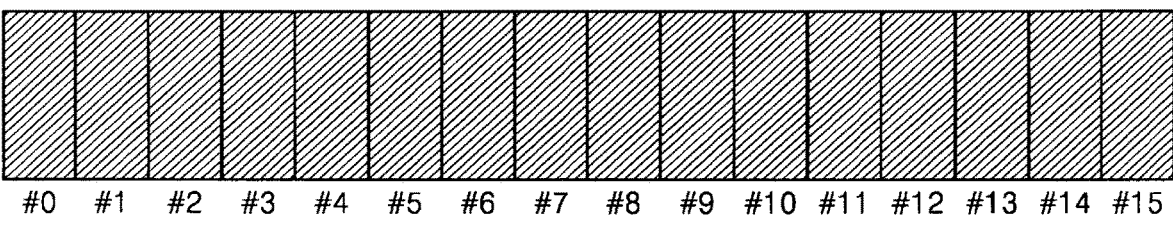
FIGS. 8A to 8C are diagrams for describing target subcarriers according to embodiments.
Figure 8B:
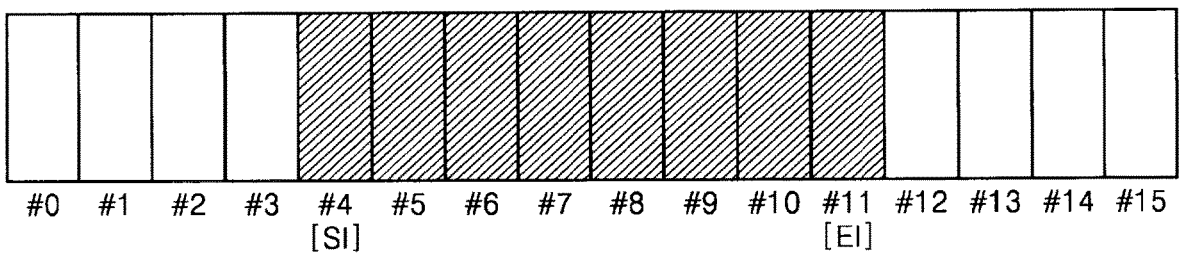
Figure 8C:
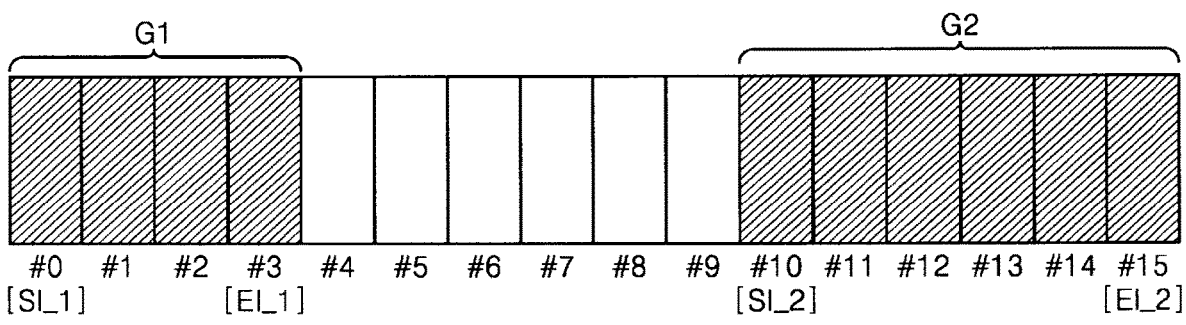

FIGS. 8A to 8C are diagrams for describing target subcarriers according to embodiments. In FIGS. 8A to 8C, it is assumed that a plurality of subcarriers include sixteen subcarriers with indices '#0' to '#15'. However, it will be fully understood that this is only an example for convenience of understanding, and the inventive concepts are not limited thereto.

Referring to FIG. 8A, a beamformee may determine all of the plurality of subcarriers (#0 to #15) as target subcarriers. That is, the beamformee may determine all of the plurality of subcarriers (#0 to #15) indicated in the 'Partial BW Info' field of FIG. 4 as target subcarriers, and override angle information corresponding to the target subcarriers to generate beamforming feedback.

Referring further to FIG. 8B, the beamformee may determine some subcarriers (#4 to #11) among the plurality of subcarriers (#0 to #15) as target subcarriers. The beamformee may determine target subcarriers, based on a predetermined (or alternatively, given) start index SI and/or a predetermined (or alternatively, given) end index EI. In detail, by referring to the start index SI and the end index EI, the beamformee may determine, as target subcarriers, a start subcarrier (#4) corresponding to the start index SI, an end subcarrier (#11) corresponding to the end index EI, and the subcarriers (#5 to #10) listed by index between the start subcarrier (#4) and the end subcarrier (#11) based on indices. In embodiments, information regarding the start index SI and the end index EI may be stored in a memory of the beamformee and managed. In embodiments, information regarding the start index SI and end index EI may be provided from the beamformer to the beamformee. For example, the information may be additionally included in the 'Partial BW Info' field of FIG. 4 and provided to the beamformee.

Referring further to FIG. 8C, the beamformee may determine first and second subcarrier groups G1 and G2 spaced apart from each other based on the index among the plurality of subcarriers (#0 to #15) as target subcarriers. The first subcarrier group G1 may include four subcarriers with indices '#0' to '#3', and the second subcarrier group G2 may include six subcarriers with indices '#10' to '#15'.

In detail, by referring to a first start index SI_1 and a first end index EI_1, the beamformee may determine, as target subcarriers, the start subcarrier (#0) corresponding to the first start index SI_1, the end subcarrier (#3) corresponding to the first end index EI_1, and the subcarriers (#1 to #2) listed by index between the first start subcarrier (#0) and the first end subcarrier (#3). In detail, by referring to a second start index SI_2 and a second end index EI_2, the beamformee may determine, as target subcarriers, the start subcarrier (#10) corresponding to the second start index SI_2, the end subcarrier #15 corresponding to the second end index EI_2, and the subcarriers (#11 to #14) listed by index between the second start subcarrier (#10) and the second end subcarrier (#15).

Figure 9:
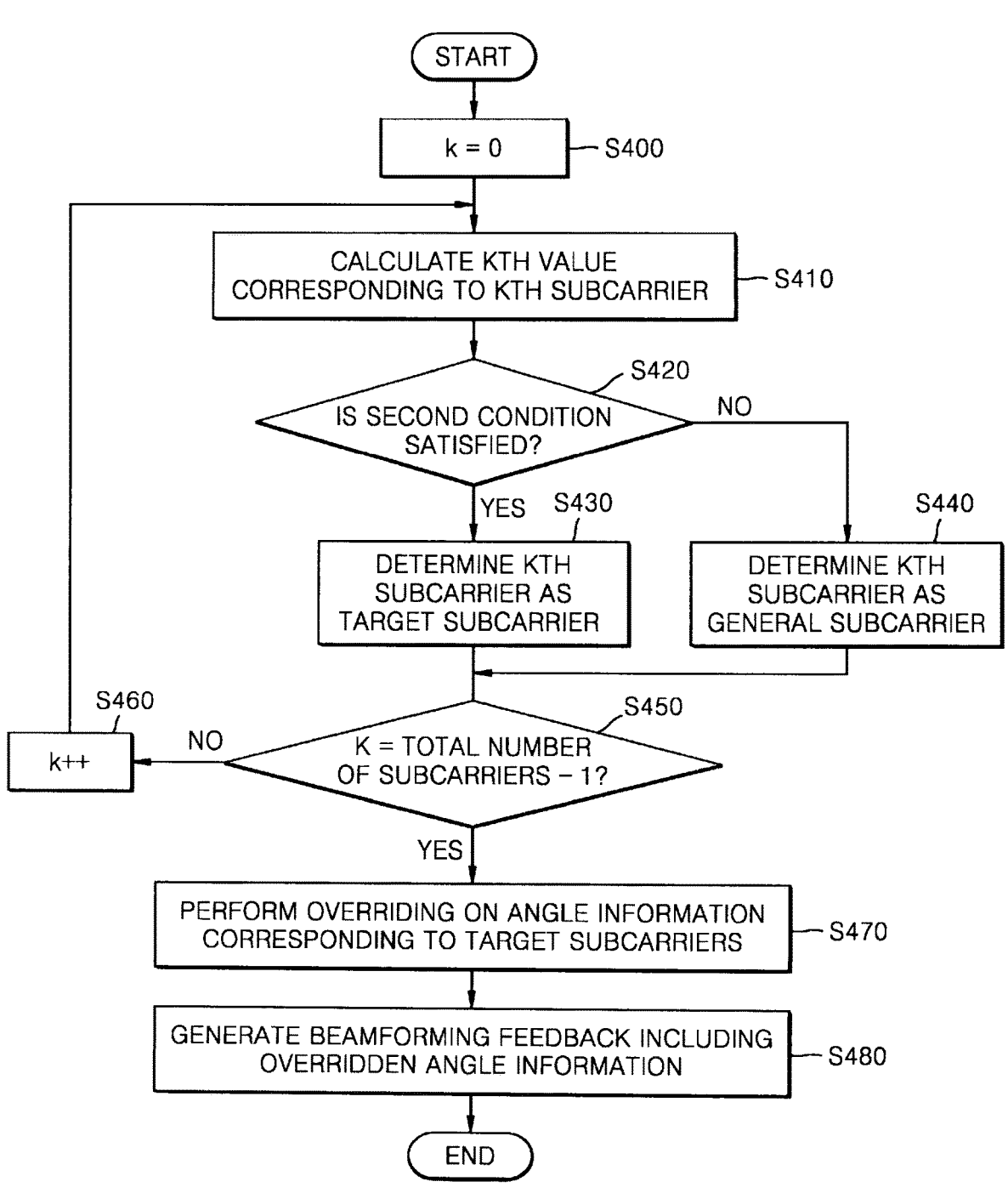
FIG. 9 is a flowchart of an operating method of a beamformee, according to embodiments.

FIG. 9 is a flowchart of an operating method of a beamformee, according to embodiments. In FIG. 9, the operation of the beamformee determining whether each subcarrier among the plurality of subcarriers corresponds to a target subcarrier is described.

Referring to FIG. 9, in operation S400, the beamformee may set k to 0 and initiate an operation to determine a target subcarrier.

In operation S410, the beamformee may calculate a kth value corresponding to a kth subcarrier. As an example, the beamformee may calculate the kth value using singular values corresponding to a plurality of streams of the kth subcarrier.

In operation S420, the beamformee may determine whether a second condition is satisfied based on the k value calculated in operation S410. As an example, the beamformee may determine whether the second condition is satisfied based on whether the kth value exceeds a threshold. In the present specification, the second condition may be defined as a condition for determining whether a subcarrier corresponds to a target subcarrier.

In response to the result of operation S420 being 'YES', in the following operation S430, the beamformee may determine the kth subcarrier as a target subcarrier.

In response to the result of operation S420 being 'NO', in the following operation S440, the beamformee may determine the kth subcarrier as a general (e.g., a normal or non-target) subcarrier. According to embodiments, the general subcarriers among the plurality of subcarriers may not include any target subcarriers, and the target subcarriers among the plurality of subcarriers may not include any general subcarriers.

In operation S450, the beamformee may determine whether k is equal to the total number of subcarriers (e.g., the total number of the plurality of subcarriers) minus 1.

In response to the result of operation S450 being 'NO', in the following operation S460, the beamformee may count up k and repeat subsequent operations including operation S410.

In response to the result of operation S450 being 'YES', in the following operation S470, the beamformee may perform overriding on angle information corresponding to target subcarriers individually determined through previous operations.

In operation S480, the beamformee may generate beamforming feedback including overridden angle information overridden in operation S470.

Figure 10A:
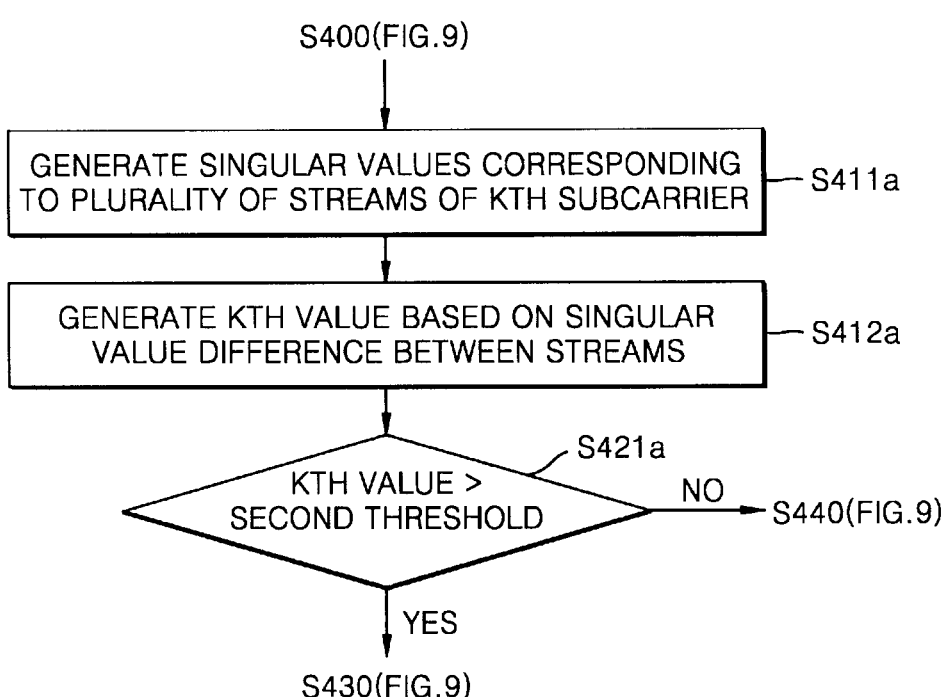
FIGS. 10A and 10B are detailed flowcharts of an operation of a beamformee in operations S410 and S420 of FIG. 9.
Figure 10B:
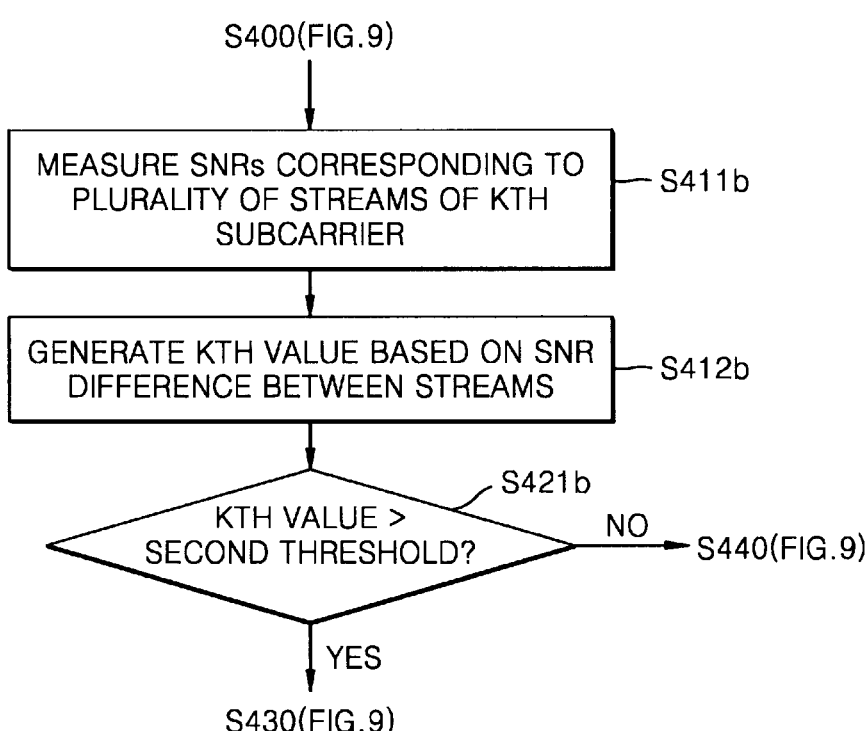

FIGS. 10A and 10B are detailed flowcharts of an operation of a beamformee in operations S410 and S420 of FIG. 9.

Referring to FIG. 10A, in operation S411a following operation S400 (FIG. 9), the beamformee may generate singular values corresponding to a plurality of streams of the kth subcarrier. As an example, the beamformee may generate singular values by performing singular value decomposition on channels corresponding to the plurality of streams of the kth subcarrier by using a predetermined (or alternatively, given) method. According to embodiments, the beamformee may generate the singular values from kth beam steering matrices corresponding to the plurality of streams.

In operation 412a, the beamformee may generate the kth value based on a singular value difference between the streams. As an example, the beamformee may generate the kth value based on the difference between the maximum (or highest) value and the minimum (or lowest) value among the singular values of the streams. As an example, the beamformee may generate the kth value based on [Equation 8] as below.

$$\text{Value}[k] = (S_{max}[k])^2 - (S_{min}[k])^2 \qquad \text{[Equation 8]}$$

$S_{max}[k]$ corresponds to the maximum (or highest) value among the singular values of the streams of the kth subcarrier, and $S_{min}[k]$ may correspond to the minimum (or lowest) value among the singular values of the streams of the kth subcarrier. According to embodiments, the difference between the maximum (or highest) value and the minimum (or lowest) value among the singular values (e.g., the kth value) may constitute a maximum (or highest) value among at least one difference between the singular values of the streams.

In operation S421a, the beamformee may determine whether the kth value exceeds a first threshold. That is, based on the kth value exceeding the first threshold, the beamformee may determine that the second condition of FIG. 9 is satisfied, and based on the kth value being equal to or less than the first threshold, the beamformee may determine that the second condition of FIG. 9 is not satisfied.

In response to the result of operation S421a being 'YES', operation S430 (FIG. 9) may follow, and in response to the result of operation S421a being 'NO', operation S440 (FIG. 9) may follow.

Referring further to FIG. 10B, in operation S411b following operation S400 (FIG. 9), the beamformee may measure signal to noise ratios (SNRs) corresponding to the plurality of streams of the kth subcarrier. As an example, the beamformee may measure SNRs corresponding to the plurality of streams of the kth subcarrier using the received NDP by a predetermined (or alternatively, given) method.

In operations 412b, the beamformee may generate the kth value based on a difference in the measured SNRs between the streams. As an example, the beamformee may generate the kth value based on the difference between the maximum (or highest) value and the minimum (or lowest) value among the measured SNRs of the streams. As an example, the beamformee may generate the kth value based on [Equation 9] as below.

$$\text{Value}[k] = (SNR_{max}[k])^2 - (SNR_{min}[k])^2 \qquad \text{[Equation 9]}$$

$SNR_{max}[k]$ corresponds to the maximum (or highest) value among the measured SNR values of the streams of the kth subcarrier, and $SNR_{min}[k]$ may correspond to the minimum (or lowest) value among the measured SNR values of the streams of the kth subcarrier. According to embodiments, the difference between the maximum (or highest) value and the minimum (or lowest) value among the SNR values (e.g., the kth value) may constitute a maximum (or highest) value among at least one difference between the SNR values of the streams.

In operation S421b, the beamformee may determine whether the kth value exceeds a second threshold. That is, based on the kth value exceeding the second threshold, the beamformee may determine that the second condition of FIG. 9 is satisfied, and based on the kth value being equal to or less than the second threshold, the beamformee may determine that the second condition of FIG. 9 is not satisfied.

In response to the result of operation S421b being 'YES', operation S430 (FIG. 9) may follow, and in response to the result of operation S421b being 'NO', operation S440 (FIG. 9) may follow.

Figure 11:
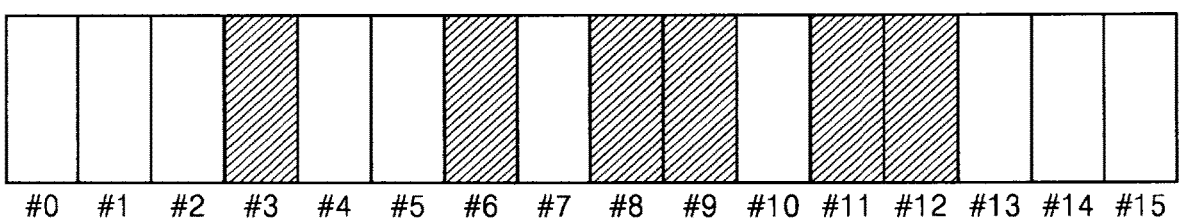
FIG. 11 is a diagram for describing target subcarriers according to embodiments.

FIG. 11 is a diagram for describing target subcarriers according to embodiments. In FIG. 11, it is assumed that a plurality of subcarriers include sixteen subcarriers with indices of '#0' to '#15'. However, it will be fully understood that this is only an example for convenience of understanding, and the inventive concepts are not limited thereto.

Referring to FIG. 11, the beamformee may determine whether each subcarrier corresponds to a target subcarrier for the first to sixteenth subcarriers (#0 to #15) and determine some subcarriers with indices of '#3', '#6', '#8', '#9', '#11', '#12', as target subcarriers. The target subcarriers (#3, #6, #8, #9, #11, #12) may include subcarriers adjacent to each other and subcarriers spaced apart from each other based on the index.

Figure 12:
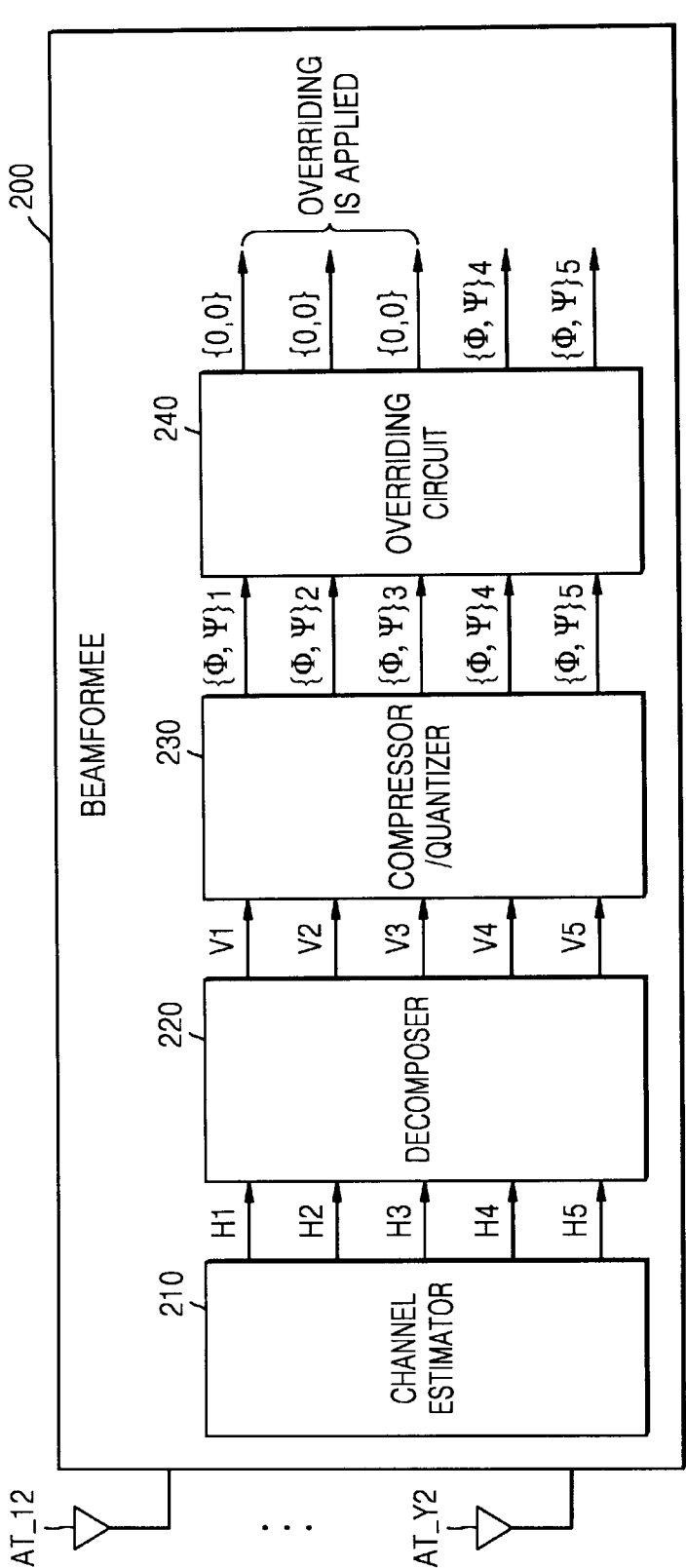
FIGS. 12 and 13 are detailed block diagrams illustrating a beamformee according to embodiments.
Figure 13:
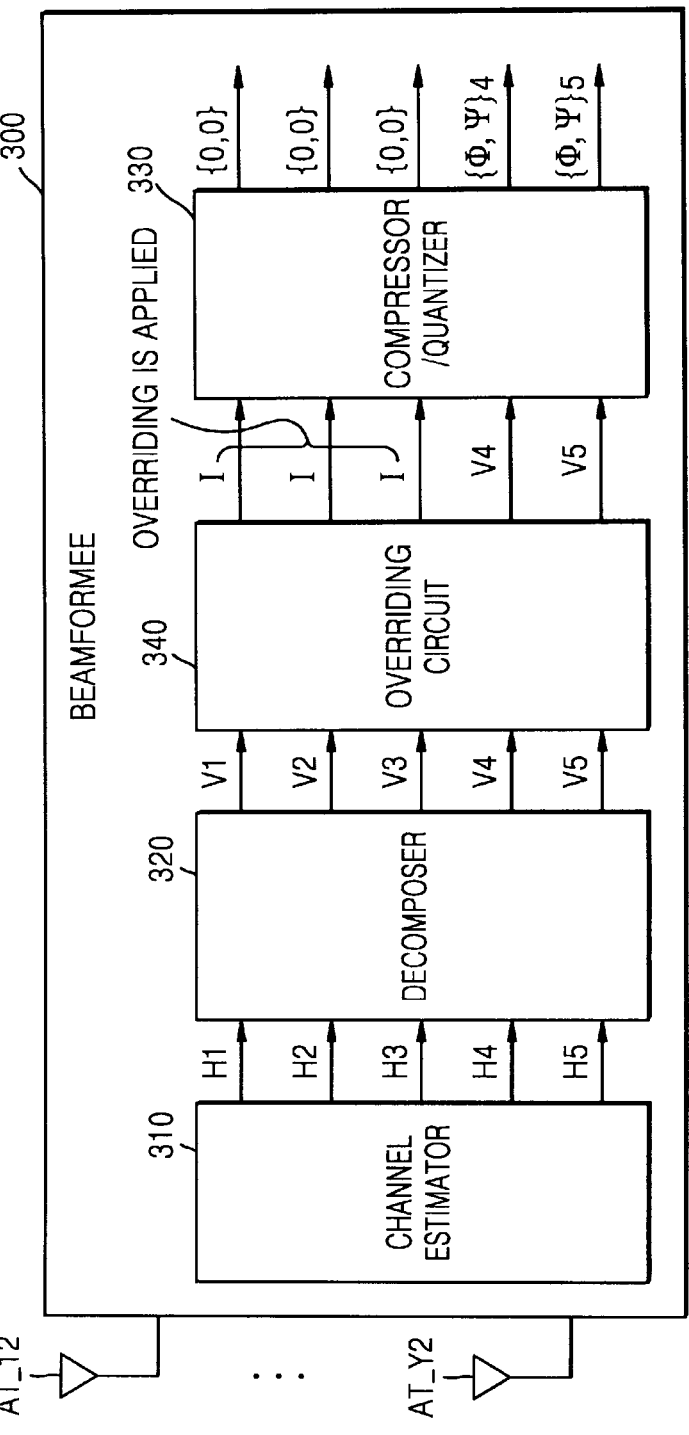

FIGS. 12 and 13 are detailed block diagrams illustrating beamformees 200 and 300 according to embodiments, respectively.

Referring to FIG. 12, the beamformee 200 may include the plurality of second antennas AT_12 to AT_Y2, a channel estimator 210, a decomposer 220, a compressor/quantizer 230, and/or an overriding circuit 240. According to embodiments, the beamformee 200 may be the same as or similar to the beamformee 100 discussed above.

The channel estimator 210 may estimate first to fifth channels H1 to H5 respectively corresponding to first to fifth subcarriers and provide the estimates to the decomposer 220. In detail, the first channel H1 may include at least one channel corresponding to the first subcarrier, the second channel H2 may include at least one channel corresponding to the second subcarrier, the third channel H3 may include at least one channel corresponding to the third subcarrier, the fourth channel H4 may include at least one channel corresponding to the fourth subcarrier, and the fifth channel H5 may include at least one channel corresponding to the fifth subcarrier.

The decomposer 220 may generate first to fifth beam steering matrices V1 to V5 through singular value decomposition of the first to fifth channels CH1 to CH5 and provide them to the compressor/quantizer 230. The first beam steering matrix V1 may include at least one beam steering matrix corresponding to the first subcarrier, the second beam steering matrix V2 may include at least one beam steering matrix corresponding to the second subcarrier, the third beam steering matrix V3 may include at least one beam steering matrix corresponding to the third subcarrier, the fourth beam steering matrix V4 may include at least one beam steering matrix corresponding to the fourth subcarrier, and the fifth beam steering matrix V5 may include at least one beam steering matrix corresponding to the fifth subcarrier.

The compressor/quantizer 230 may generate first to fifth angle information ({φ,ψ} 1 to {φ,ψ}5) based on the first to fifth beam steering matrices V1 to V5 and provide the first to fifth angle information to the overriding circuit 240.

In embodiments, the overriding circuit 240 may determine the first to third subcarriers as target subcarriers and override (or replace) the first to third angle information ({φ,ψ} 1, {φ,ψ} 2, {φ,ψ} 3) corresponding to the first to third subcarriers, as {0, 0}.

Thereafter, the beamformee 200 may generate beamforming feedback including the overridden first to third angle information ({0, 0}) and the fourth and fifth angle information ({ϕ,ψ} 4, {ϕ,ψ} 5), and transmit the same to the beamformer.

Referring further to FIG. 13, the beamformee 300 may include the plurality of second antennas AT_12 to AT_Y2, a channel estimator 310, a decomposer 320, a compressor/quantizer 330, and/or an overriding circuit 340. According to embodiments, the beamformee 300 may be the same as or similar to the beamformee 100 (and/or the beamformee 200) discussed above.

The channel estimator 310 may estimate first to fifth channels H1 to H5 corresponding to the first to fifth subcarriers and provide the estimates to the decomposer 320.

The decomposer 220 may generate first to fifth beam steering matrices V1 to V5 through singular value decomposition of the first to fifth channels CH1 to CH5 and provide them to the overriding circuit 340.

In embodiments, the overriding circuit 340 may determine the first to third subcarriers as target subcarriers and override (or replace) the first to third beam steering matrices V1, V2, V3 corresponding to the first to third subcarriers as (or with) the first unitary matrices (I). The overriding circuit 340 may provide the overridden beam steering matrices (I) and the fourth and fifth beam steering matrices V4 and V5 to the compressor/quantizer 330.

The compressor/quantizer 330 may generate the overridden first to third angle information ({0, 0}) and the fourth and fifth angle information ({ϕ,ψ} 4, {ϕ,ψ} 5), based on the overridden beam steering matrices (I) and the fourth and fifth beam steering matrices V4 and V5.

Thereafter, the beamformee 300 may generate beamforming feedback including the overridden first to third angle information ({0, 0}), and the fourth and fifth angle information ({ϕ,ψ} 4, {ϕ,ψ} 5) and transmit the same to the beamformer.

FIG. 14 is a diagram illustrating information included in a feedback frame (TB) to which embodiments of the inventive concepts are applied. In the following, it is assumed that the feedback frame is based on the EHT protocol standard, but this is only an example and embodiments are not limited thereto, and the feedback frame may be implemented in a format based on various protocol standards including the EHT+ protocol standard.

Referring to FIG. 14, the feedback frame generated by the beamformee may include a 'Category' field, an 'EHT Action' field, an 'EHT MIMO Control' field, an 'EHT Compressed Beamforming Report' field, an 'EHT MU Exclusive Beamforming Report' field, and an 'EHT CQI Report' field, which are listed in order. The beamformee may perform overriding on information included in a predetermined (or alternatively, given) subfield within the 'EHT Compressed Beamforming Report' field based on embodiments.

Furthermore, based on embodiments, the beamformee may perform overriding on information included in at least one predetermined (or alternatively, given) subfield among the 'EHT MU Exclusive Beamforming Report' field, the 'EHT MIMO Control' field, and the 'EHT CQI Report' field.

Figure 15:
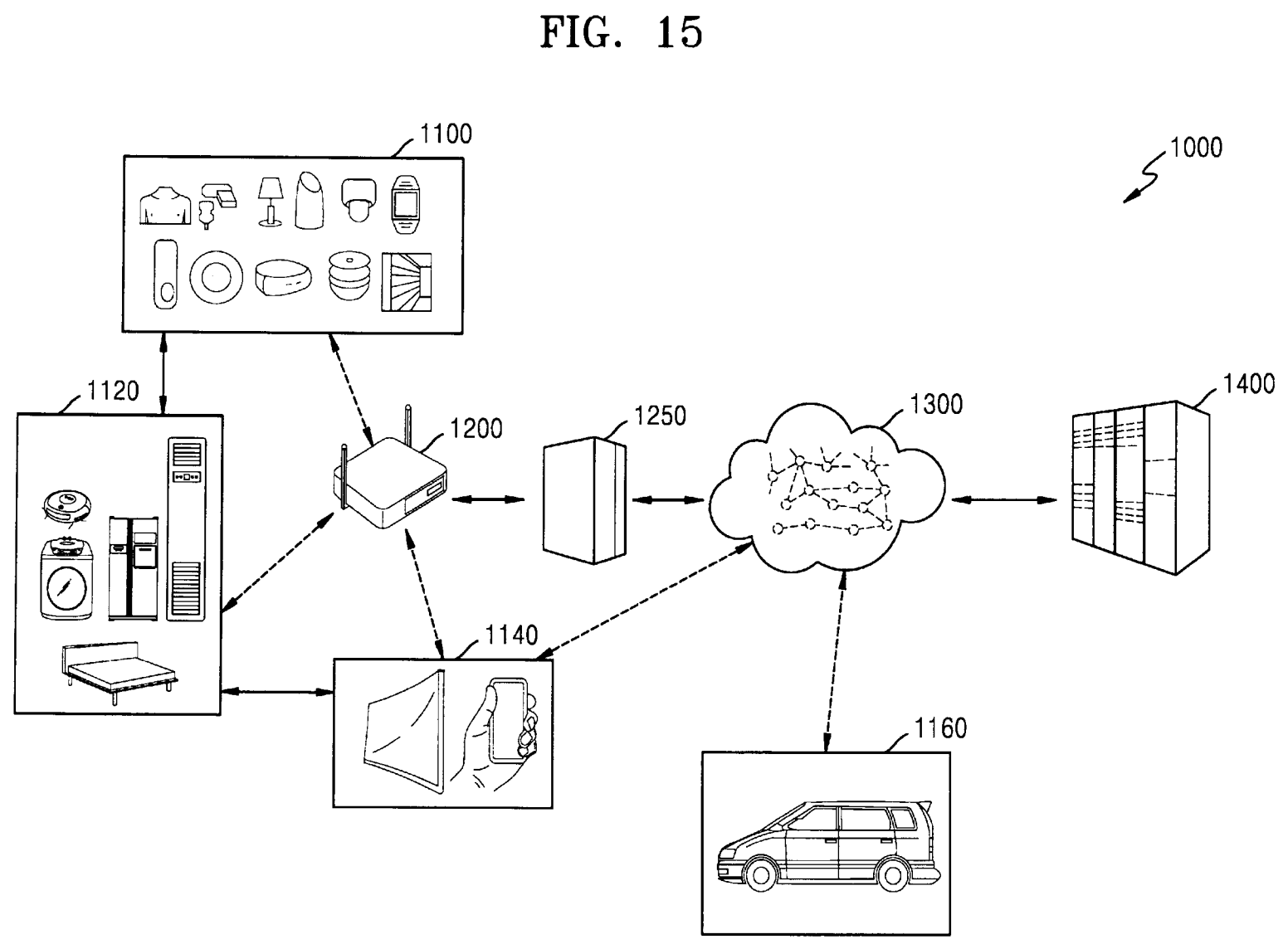

FIG. 15 is a conceptual diagram illustrating an Internet-of-Things (IoT) network system 1000 to which embodiments of the inventive concepts are applied.

Referring to FIG. 15, the IoT network system 1000 may include a plurality of IoT devices 1100, 1120, 1140, and/or 1160, an access point 1200, a gateway 1250, a wireless network 1300, and/or a server 1400. IoT may refer to a network between things using wired/wireless communication.

Each IoT device 1100, 1120, 1140, or 1160 may form a group according to the characteristics of each IoT device. For example, the IoT devices 1100, 1120, 1140, and 1160 may be grouped into a plurality of groups. For example, the plurality of groups include a home gadget group 1100, a home appliances/furniture group 1120, an entertainment group 1140, or a vehicle group 1160. The plurality of IoT devices 1100, 1120, and 1140 may be connected to a communication network through the access point 1200 or to other IoT devices. The access point 1200 may be built into a single IoT device. The gateway 1250 may change a protocol to connect the access point 1200 to an external wireless network. The IoT devices 1100, 1120, and 1140 may be connected to an external communication network through the gateway 1250. The wireless network 1300 may include the Internet and/or a public network. The plurality of IoT devices 1100, 1120, 1140, and 1160 may be connected to the server 1400 that provides a certain service through the wireless network 1300, and a user may use a service through at least one of the plurality of IoT devices 1100, 1120, 1140, and 1160.

According to embodiments, the plurality of IoT devices 1100, 1120, 1140, and 1160 may determine the target subcarriers described above and efficiently operate a beamforming process by generating overridden angle information corresponding to the target subcarriers through an overriding operation. As a result, the IoT devices 1100, 1120, 1140, and 1160 may perform efficient and effective communication and provide quality services to users.

Conventional devices and methods for performing beamforming involve a beamformer receiving feedback information about a channel from a beamformee. The feedback information is provided, and beamforming performed according to the feedback information, regardless of the state of a communication environment between the beamformer and beamformee. Accordingly, the conventional devices and methods perform the same (or a similar) provision of feedback information, and performance of beamforming, in scenarios in which the communication environment significantly reduces the data throughput of the beamforming performed. As such, the conventional devices and methods result in insufficient beamforming efficiency and/or excessive resource consumption/wastage (e.g., power, bandwidth, delay, processor, memory, etc.).

However, according to embodiments, improved devices and methods are provided for performing beamforming. For example, the improved devices and methods may perform an overriding operation in scenarios in which the communication environment satisfies a condition (e.g., significantly reduces beamforming throughput). The overriding operation may include replacing angle information (e.g., with information causing beamforming not to be performed) of target subcarriers (e.g., subcarriers for which a variance in signal values exceeds a threshold) included in the feedback information. In so doing, the improved devices and methods may avoid or reduce the performance of beamforming using resources (e.g., subcarriers) for which beamforming would be less efficient. Therefore the improved devices and methods overcome the deficiencies of the conventional devices and methods to at least improve beamforming efficiency and/or reduce resource consumption/wastage (e.g., power, bandwidth, delay, processor, memory, etc.).

According to embodiments, operations described herein as being performed by the wireless communication system 10, each of the first and second access points AP1, AP2, the first station STA1, the second station STA2, the third station STA3, the fourth station STA4, the beamformer 30, the beamformee 100, the wireless communication system 20, the controller 30_1, the beamforming circuit 30_2, the channel estimator 110, the beamforming feedback generator 120, the overriding circuit 121, the transceiver of the beamformer 30, the transceiver of the beamformee 100, the beamformee 200, the channel estimator 210, the decomposer 220, the compressor/quantizer 230, the overriding circuit 240, the beamformee 300, the channel estimator 310, the decomposer 320, the compressor/quantizer 330, the overriding circuit 340, the IoT network system 1000, each among the plurality of IoT devices 1100, 1120, 1140, and 1160, the access point 1200, the gateway 1250 and/or the server 1400 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. In software implementations, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" that precede a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. An operating method of a first device communicating with a second device in a wireless local area network (WLAN) system, the WLAN system including the first device and the second device, and the method comprising:
estimating channels corresponding to a plurality of subcarriers using a null data packet (NDP) received from the second device to obtain estimated channels;
generating beam steering matrices corresponding to the plurality of subcarriers by performing singular value decomposition on the estimated channels;
generating overridden angle information based on the beam steering matrices, the overridden angle information corresponding to target subcarriers among the plurality of subcarriers; and
transmitting beamforming feedback to the second device, the beamforming feedback including the overridden angle information.

2. The method of claim 1, further comprising:
determining the target subcarriers to include all of the plurality of subcarriers.

3. The method of claim 1, further comprising:
determining the target subcarriers to include a subset of the plurality of subcarriers.

4. The method of claim 3, wherein the subset of the plurality of subcarriers comprises subcarriers sequentially arranged by index between a start subcarrier and an end subcarrier among the plurality of subcarriers, the start subcarrier corresponding to a start index, and the end subcarrier corresponding to an end index.

5. The method of claim 3, wherein the generating of the overridden angle information comprises: generating angle information corresponding to subcarriers other than the target subcarriers among the plurality of subcarriers, the beamforming feedback including the overridden angle information.

6. The method of claim 1, wherein the plurality of subcarriers match subcarriers indicated in a 'Partial BW Info' field of an NDP announcement (NDPA) frame received from the second device.

7. The method of claim 1, further comprising:
determining whether each respective subcarrier among the plurality of subcarriers is among the target subcarriers.

8. The method of claim 7, wherein
the plurality of subcarriers comprise a first subcarrier; and
the determining comprises:
  generating singular values corresponding to a plurality of streams of the first subcarrier,
  comparing a maximum value among at least one difference with a threshold to obtain a comparing result, the at least one difference being between the singular values; and
  determining whether the first subcarrier is among the target subcarriers based on the comparing result.

9. The method of claim 7, wherein
the plurality of subcarriers comprise a first subcarrier; and
the determining comprises:
  measuring signal to noise ratios (SNRs) corresponding to a plurality of streams of the first subcarrier,
  comparing a maximum value among at least one difference with a threshold to obtain a comparing result, the at least one difference being between the SNRs, and
  determining whether the first subcarrier is among the target subcarriers based on the comparing result.

10. The method of claim 7, wherein the target subcarriers comprise first and second subcarriers spaced apart from each other based on an index.

11. The method of claim 1, wherein
the beam steering matrices comprise first beam steering matrices corresponding to the target subcarriers; and
the generating of the overridden angle information comprises:
  generating first angle information corresponding to the target subcarriers based on the first beam steering matrices, and
  generating the overridden angle information by replacing values of the first angle information with values corresponding to a unitary matrix.

12. The method of claim 1, wherein
the beam steering matrices comprise first beam steering matrices corresponding to the target subcarriers; and
the generating of the overridden angle information comprises:
  replacing the first beam steering matrices with unitary matrices, and
  generating the overridden angle information from the unitary matrices.

13. The method of claim 1, further comprising:
monitoring a communication state with the second device; and determining whether the communication state satisfies an overriding condition,
wherein the generating of the overridden angle information is performed in response to determining that the communication state satisfies the overriding condition.

14. The method of claim 13, wherein the overriding condition comprises: a condition in which a number of negative acknowledgments (NACKs) transmitted to the second device during a period of time exceeds a threshold number.

15. The method of claim 13, wherein the overriding condition comprises: a condition in which data throughput due to beamforming between the first device and the second device is below a threshold.

16. The method of claim 1, wherein the first device communicates with the second device in the WLAN system based on an extremely high throughput (EHT) protocol standard.

17. A first device communicating with a second device in a wireless local area network (WLAN) system, the first device comprising:
processing circuitry configured to:
  estimate channels corresponding to a plurality of subcarriers using a null data packet (NDP) received from the second device to obtain estimated channels, and
  generate overridden angle information based on beam steering matrices and unitary matrices, the overridden angle information corresponding to target subcarriers among the plurality of subcarriers, the beam steering matrices and the unitary matrices corresponding to the plurality of subcarriers, and the beam steering matrices and the unitary matrices being generated based on the estimated channels.

18. The first device of claim 17, wherein the processing circuitry is configured to: generate the overridden angle information in response to determining that a communication state with the second device meets an overriding condition.

19. The first device of claim 17, wherein the processing circuitry is configured to; determine that the target subcarriers include some or all of the plurality of subcarriers.

20. The first device of claim 17, wherein the processing circuitry is configured to; transmit beamforming feedback to the second device, the beamforming feedback including the overridden angle information.

* * * * *